United States Patent [19]

Fukunaga

[11] Patent Number: 5,522,043

[45] Date of Patent: May 28, 1996

[54] FIELD BUS SYSTEM HAVING AUTOMONOUS CONTROL OPERATION

[75] Inventor: Masao Fukunaga, Katsuta, Japan

[73] Assignee: Hitachi, Ltd., Tokyo, Japan

[21] Appl. No.: 410,561

[22] Filed: Mar. 24, 1995

Related U.S. Application Data

[63] Continuation of Ser. No. 783,917, Oct. 29, 1991, abandoned.

[30] Foreign Application Priority Data

Nov. 22, 1990 [JP] Japan ................................ 2-319857

[51] Int. Cl.$^6$ .................................................. G06F 13/38
[52] U.S. Cl. ................... 395/200.01; 364/DIG. 1;
364/DIG. 2; 364/221; 364/221.1; 364/222.2;
364/222.3; 364/228; 364/228.1; 364/228.3;
364/228.5; 364/232.7; 364/236.2; 364/238.3;
364/238.4; 364/238.5; 364/241.2; 364/241.3;
364/242.3; 364/242.5; 364/243; 364/243.5;
364/243.7; 364/245; 364/245.2; 364/248.1;
364/264; 364/265; 364/268
[58] Field of Search ...................... 364/DIG. 1 MS File,
364/DIG. 2 MS File; 395/180, 181, 182.02,
200.01, 200.02, 200.03, 200.05, 200.1,
200.13

[56] References Cited

U.S. PATENT DOCUMENTS

| | | | |
|---|---|---|---|
| 4,156,907 | 5/1979 | Rawlings et al. | 395/200 |
| 4,200,930 | 8/1980 | Rawlings et al. | 395/200 |
| 4,373,183 | 2/1983 | Means et al. | 395/325 |
| 4,517,644 | 5/1985 | Hamada et al. | 395/200 |
| 5,084,868 | 1/1992 | Kelly et al. | 370/69.1 |
| 5,111,460 | 5/1992 | Botzenhardt et al. | 371/29.1 |
| 5,166,931 | 11/1992 | Riddle | 370/94.1 |

*Primary Examiner*—Robert B. Harrell
*Attorney, Agent, or Firm*—Antonelli, Terry, Stout & Kraus

[57] ABSTRACT

An autonomous distributed field bus system includes a host apparatus disposed in a control room, a plurality of detection and control blocks disposed in a field, and a bus line for connecting the host apparatus to the plurality of blocks. Each of the plurality of control blocks includes a detection device, an arithmetic and control device and an operating device, and forms a control loop. The arithmetic and control device produces a control signals by using control parameters stored therein on the basis of the measured value detected by the detection device. The operating device is operated by the control signal. Control operation is thus performed in each of the blocks without participation of the host apparatus.

17 Claims, 5 Drawing Sheets

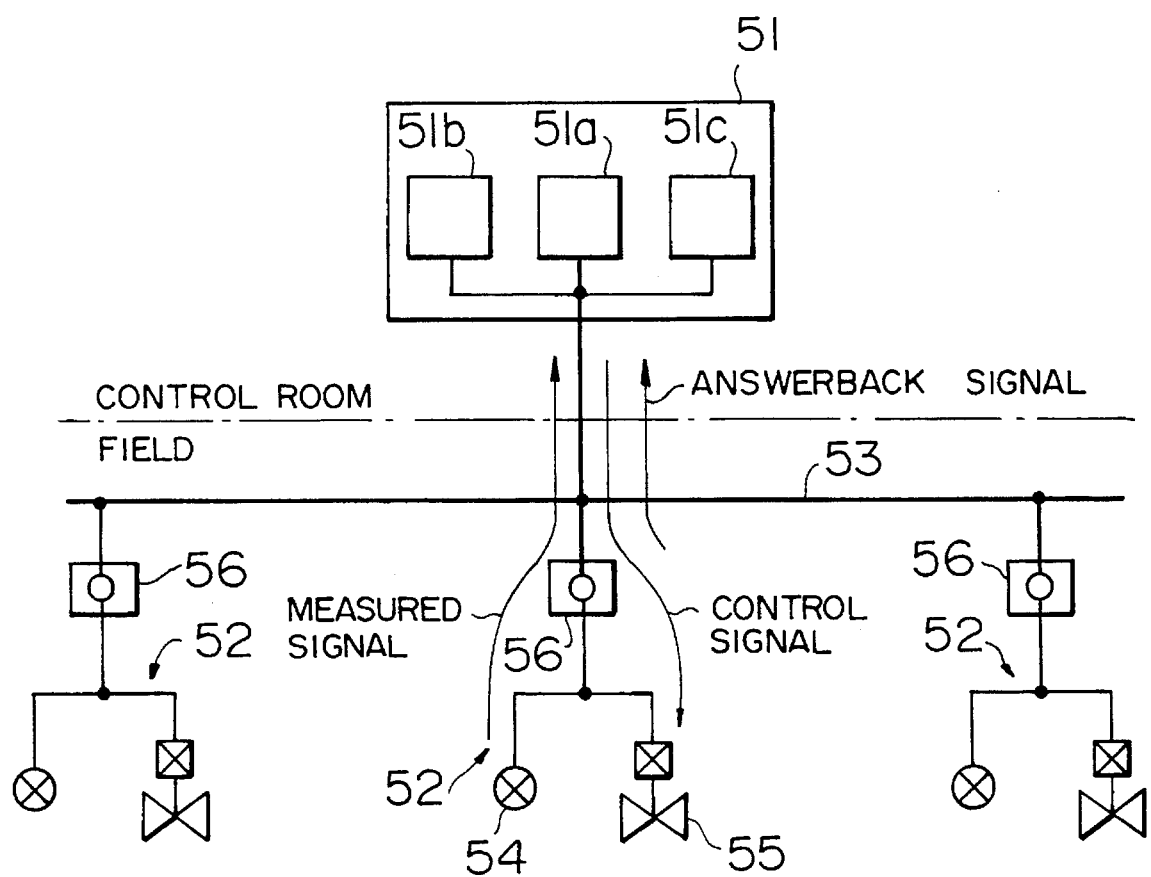

FIELD BUS SYSTEM HAVING AUTOMONOUS CONTROL OPERATION

This application is a continuation of Ser. No. 07/783,917, filed Oct. 29, 1991, now abandoned.

BACKGROUND OF THE INVENTION

1. Field of the Invention

The present invention relates to an autonomous distributed field bus system applied to an industrial measuring control system. More particularly, the present invention relates to an autonomous distributed field bus system which can maintain normal operation stably when a failure occurs in a host control apparatus and which enables trial operation needed for the construction of a new system to be readily performed in another aspect.

2. Description of the Related Art

A typical configuration of conventional field bus systems will be explained with reference to FIG. 5. The field bus system consists of a control room and a field. The control room has a host apparatus 51 for controlling/managing the entire system. The field contains a plurality of blocks 52 for executing various detections and control operations. Each of the blocks 52 and the host apparatus 51 make a control loop in their respective combination. The host apparatus 51 and the individual blocks 52 are interconnected by a field bus 53. Multidrop connection is used for the connection between the host apparatus 51 and the blocks 52. The host apparatus 51 includes an arithmetic and control device 51a, a communication and bus control device 51b and a power device 51c. Each of the blocks 52 includes a transmitter 54 acting as a detection device, and an actuator 55 acting as an operation device. Every block 52 is connected to the field bus 53 through a junction device 56.

In the system arranged in the manner mentioned above, a detection signal output from the transmitter 54 is sent to the host apparatus 51 through the field bus 53. The arithmetic and control device 51a produces a control signal on the basis of the data obtained from the detection signal. The control signal is sent through the field bus 53 to the actuator 55 to control the actuator 55 in a desired manner. When necessary, the actuator 55 returns an answer back signal to the host apparatus 51 through the field bus 53.

The aforementioned transmission operations between each of the many blocks 52 and the host apparatus 51 are adequately timed. Therefore, various types of data from the host apparatus 51 and the individual blocks 52 flow on the field bus 53. The flow of data on the field bus 53 is controlled by the communication and bus control device 51b of the host apparatus 51. Thus, the communication and bus control device 51b adjusts communication requests between the components of the system.

According to the configuration of the conventional field bus system, communications and controls are performed by the host apparatus 51 which adopts a digital distributed control system (DCS). Control of the flow of signals in the entire field bus and management as well as control of the bus line are performed by the digital distributed control system. A configuration of the digital distributed control system exists as an extension of the conventional measuring control system and is hence natural as a system configuration.

However, such a conventional system has the following problems.

First, the host apparatus of the control room participates in the calculations and controls required for controlling the control loop, including the detection device and the operation device. It is therefore likely that any failure in the host apparatus will lead to a failure of the entire system. In other words, the conventional system is susceptible to damage by failures in the control room.

Secondly, when the conventional system is newly constructed, first, individual local devices are installed and their operations are checked, and then the host apparatus is installed and connected to the local devices and the operation of the entire system is checked. Since progress of construction of the field instruments, which are the local devices, in general differs, checking of the operation of the combination of these field instruments and the host apparatus, which is done after checking all of the operations of the field instruments, is delayed considerably. Before the field instruments are respectively connected to the host apparatus, they must be run on a trial basis without participation of the host apparatus. This is done by using a simulator in place of the host apparatus. This simulator is controlled on a real-time basis and is quite large in scale. In addition, excellent operation of the field instruments obtained by using the simulator does not guarantee excellent actual operation, that is, perfect and safe operation of the field instruments.

Thirdly, control of the entire system is disabled by failures occurring in the host apparatus, or disconnection of the communication path between the host apparatus in the control room and the junction device in the field due to noises, that is, the system is susceptible to damage by the failures. In the above-mentioned conventional system, trouble readily occurs, particularly in the communication path between the host apparatus and the junction device.

Fourthly, in a steady state of control, the host apparatus must exchange data with the detection device and the operation device of each of the control loops at the response speed required for each of the control loops. Since some of the control loops may have a slow response speed, the host apparatus's communication load of the communications with such control loops increases, thus increasing the entire communication load of the host apparatus.

SUMMARY OF THE INVENTION

In view of the aforementioned problems, a main object of the present invention is to provide an autonomous distributed field bus system which has a high degree of freedom when the operation of the system is started, has a high response speed, and assures a highly reliable operation. This is achieved by providing an arithmetic and control device, which was conventionally provided in a host apparatus of a control room, in a field or in each block in the field. This enables detections and operations carried out in the plurality of blocks in the field to be controlled without participation of the host apparatus in a normal control operation and enables every block to be controlled independently with or without communications performed between the individual blocks.

Another object of the present invention is to provide an autonomous distributed field bus system in which the field is not affected by trouble occurring in the control room, and which can thus be run stably, and assures highly reliable operation.

Another object of the present invention is to provide an autonomous distributed field bus system which has a flexible configuration. This is achieved by setting or changing control parameters stored in the arithmetic and control device provided in the field by an instruction given from the host apparatus and by controlling the blocks in the field directly from the host apparatus in an abnormal state.

To achieve these objects, the present invention provides an autonomous distributed field bus system which comprises a host apparatus disposed in a control room, a plurality of detection and control blocks disposed in a field, and a bus line for connecting the host apparatus to the plurality of blocks. Each of the plurality of blocks includes a detection device, an arithmetic and control means and an operating device, and forms a control loop. The arithmetic and control means produces a control signal by using control parameters stored therein on the basis of the measured value detected by the detection device. The operating device is operated by the control signal. Control operation is thus carried out in each of the blocks without participation of the host apparatus.

The arithmetic and control means conventionally provided in the host apparatus of the control room are disposed in the field. Particularly, in the above structure, the arithmetic and control means are provided in each block respectively. Consequently, the control loops are formed on the field side independently of the host apparatus, that is, the control operations are performed autonomously on the field side. Also, control functions are distributed in terms of the relation between the control room and the field or between the host apparatus and the individual control blocks. When the value of a varying quantity is detected by the detection device in each block which outputs it as a measurement signal, it is input to the arithmetic and control means in that block. The arithmetic and control means produces a control signal on the basis of this measuring signal and control parameters stored therein, and operates an actuator which is the operating device by the control signal.

In a preferred configuration, each of the plurality of blocks in the autonomous distributed field bus system according to the present invention includes only the detection device and the operating device. A single arithmetic and control means is disposed on the field side. The control loop is formed by the single arithmetic and control means and each of the blocks. The arithmetic and control means produces a control signal by using the control parameters stored therein on the basis of the measured value detected by the detection device in any of the blocks, and operates the operating device in the corresponding block by the control signal. Thus, control operation can be performed without participation of the host apparatus.

In the above preferred configuration, the single arithmetic and control means is provided in the field. This arithmetic and control means performs control operation similar to that carried out in the aforementioned configuration.

In the above configuration, preferably, the host apparatus receives an output signal from the detection device and the arithmetic and control means, and thereby monitors the detecting and control states in the field.

Either of the aforementioned configurations may be modified in the following manner.

Monitoring by the host apparatus may be carried out only in a normal state. When necessary, the host apparatus may give control commands to the control loops or the single arithmetic and control means in the field.

A communication buffer may be provided between the host apparatus and the field devices so that influence of abnormality generated in the control room upon the field can be eliminated and normal control operation can thus be maintained on the field side.

The communication buffer may include a communication abnormality detection device so as to allow control operation to be performed only by the field instruments when the communication abnormality detection device detects communication abnormality.

The control parameters stored in the arithmetic and control means may define the features of the control functions. They may be set or changed by the host apparatus.

The control parameters stored in the arithmetic and control means may also be set or changed by a terminal which can be detachably mounted through the bus line.

The arithmetic and control means includes an adjusting device for setting or changing the control parameters.

A bus control portion may be provided in the field. The bus control portion may give the bus control right to the plurality of detection devices, the plurality of arithmetic and control means and the host apparatus, and relatively reduce the frequency at which it gives the bus control right to the arithmetic and control means.

The bus control portion may give the bus control right to the plurality of components of the system in a circulating fashion. Cascade communication may be partly used in the communications between the plurality of components.

As stated above, in the field bus system according to the present invention, the host apparatus does not participate in the normal control operation. The host apparatus monitors predetermined contents. In a non-normal state, the host apparatus can give control commands to the control blocks in the field, when necessary.

In the configuration in which the communication buffer is provided on the bus line between the field and the host apparatus of the control room, the communication buffer basically has a function of separating the field from the control room. When any abnormality is detected by the data abnormality detection device provided in the communication buffer, the field can therefore be operated independently. Consequently, sound operation of the system can be maintained and stable operation can be assured.

In the configuration in which the control parameters stored in the arithmetic and control means provided in the field can be externally set or changed, either the host apparatus, a specially prepared terminal or the adjusting device can be used.

Control functions are distributed among the control blocks on the field side. Communications between the plurality of control blocks and the host apparatus are controlled by the bus control portion provided in the field. Consequently, smooth communications is made possible.

BRIEF DESCRIPTION OF THE DRAWINGS

FIG. 5 shows an example of a conventional field bus system.

DESCRIPTION OF THE PREFERRED EMBODIMENTS

Embodiments of the present invention will now be described with reference to the accompanying drawings.

First, major terms are defined. "Autonomous" means that required control can be performed on a field side or in each of the control blocks on the field side, and "distributed" means that control functions are distributed in every arbitrarily given units. Regarding the arrangement of a field bus, various types of arrangements other than that shown in figures can be considered.

Figure 1:
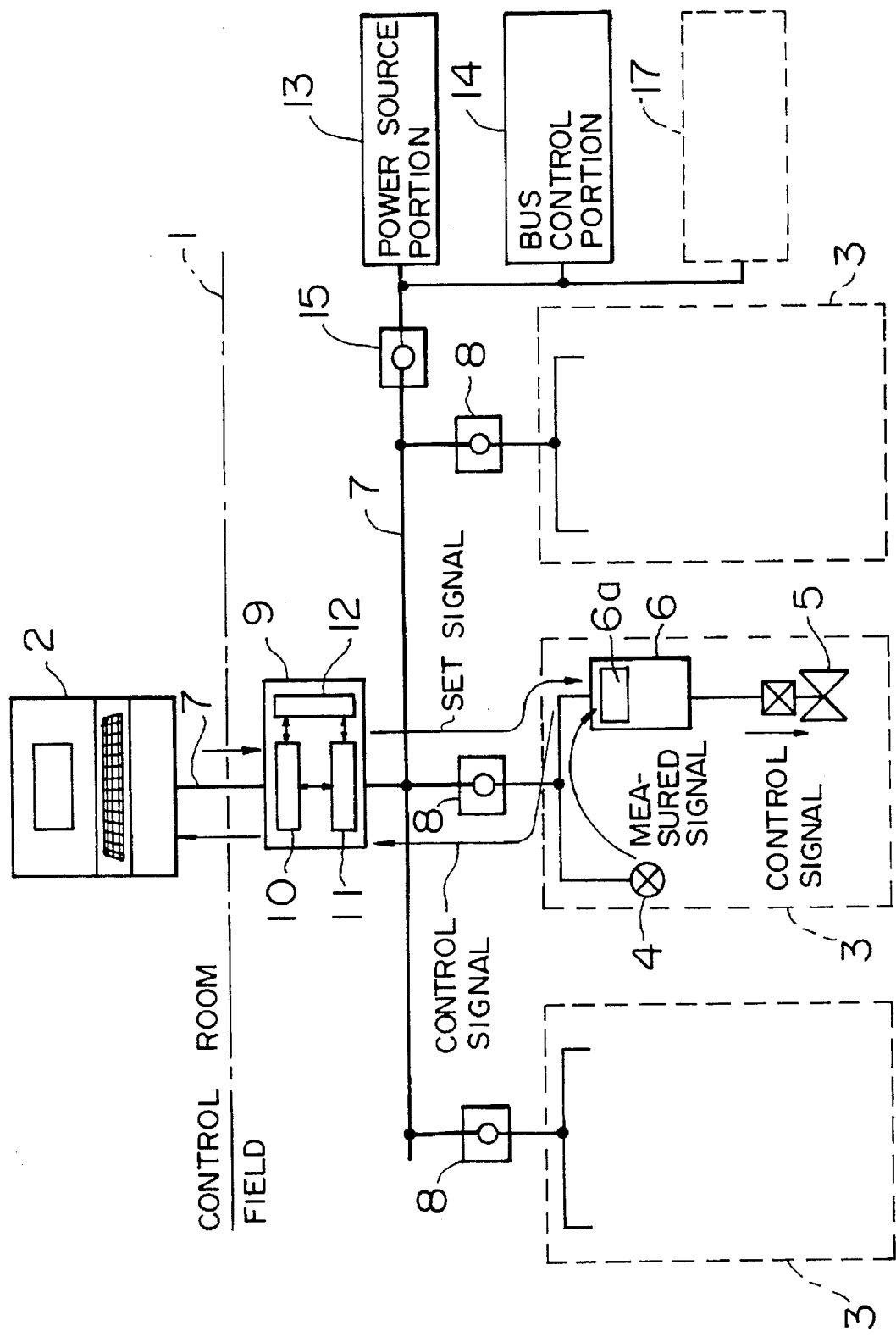
FIG. 1 shows an embodiment of an autonomous distributed field bus system according to the present invention.

As seen in FIG. 1, a field bus system is divided by a boundary line 1 into a control room shown above and a field shown below. The control room contains a host apparatus 2. The host apparatus 2 includes a CRT display device and an operation panel, and an arithmetic and control device which functions as a host device. The arithmetic and control device in the host apparatus 2 monitors instruments in the field in a normal operation, and outputs to the field instruments instructions for setting or changing control parameters and control commands when necessary. In the field, a large number of control loops 3 respectively constituting the field instrument are installed. These loops respectively correspond to the blocks explained in connection with the conventional system configuration. Each of the loops 3 has a configuration which implements a proper function allocated thereto, and includes a transmitter 4, an actuator 5 and an arithmetic and control portion 6 which exists between the transmitter 4 and the actuator 5. The control function given to the arithmetic and control portion 6 in general differs in each loop. Typical control function given to the arithmetic and control portion 6 is the function as a controller. The arithmetic and control portion 6 has a memory 6a which stores the control parameters which define control characteristics. Consequently, in each loop 3, the measured value detected by the transmitter 4 is sent to the arithmetic and control portion 6 which calculates a control value on the basis of the control parameters. The control signal based on this control value is supplied to the actuator 5 by the arithmetic and control portion 6 to perform operation required for a desired control.

The host apparatus 2 and the individual loops 3 are interconnected by a field bus 7. The field bus 7 also connects the loops 3 with each other on the field side. A junction device 8 is disposed at the input/output end of each loop 3 so that the loop 3 can be connected to the field bus 7 through the junction device 8. In the field bus 7 is also provided a communication buffer 9 on the communication path between the host apparatus 2 and the individual junction devices. The communication buffer 9 is disposed on the field side. The communication buffer 9 includes data buffers 10 and 11 and an abnormal data detecting portion 12.

On the field side, a power portion 13 and a bus control portion 14 are connected to the field bus 7 through a junction device 15. The power portion 13 supplies power to the field bus 7. Consequently, the power from the power portion 13 is supplied to double-wire type field instruments included in the field instruments connected to the field bus 7. The bus control portion 14 adjusts communication requests (rights of communication) output from the loops 3 connected to the bus line, and thereby manages flow of data on the field bus 7. The reason for disposing the power portion 13 and the bus control portion 14 on the field side is to achieve self control on the field side.

The control operation of the field bus system arranged in the manner explained above will be explained below.

In each loop 3, the transmitter 4 measures the value of a process varying quantity, converts it into an electric signal (a digital signal) and outputs the measured value by serial communications. The output signal from the transmitter 4 is not only sent to the arithmetic and control portion 6 in that loop but also output to the field bus 7 through the junction device 8. The signal output to the field bus 7 is sent to all of the other loops connected to the bus line. In principle, the arithmetic and control portion 6 contained in the same loop receives the measurement signal sent from the transmitter 4, and performs predetermined calculations using the measurement signal to produce a control signal. To obtain this control signal, the control parameters stored in the memory 6a are used, as stated above. The obtained control signal is given to the actuator 5 in the same loop to perform the operation required for a desired control. Thus, the single control loop is formed by the components of the single loop 3. The measurement signal sent to the other loops may be often used to calculate a control signal respectively required in those loops.

The measurement signal sent to the field bus 7 from the transmitter 4 in each loop is also supplied to the host apparatus 2 through the communication buffer 9. The communication buffer 9 has the function of asynchronously performing communications between the host apparatus 2 and each of the field instruments. It has also the function of detecting an abnormality when a failure occurs in the host apparatus 2 or on the communication path in the control room and abnormal data thus appears, and of thereby separating the host apparatus 2 from the field side so as to maintain normal control operation on the field side. As stated above, the measurement signal output from the transmitter 4 in each loop 3 is sent to the host apparatus 2 through the field bus 7. In a normal state, the host apparatus 2 receives the measurement signal and thereby monitors the state of the field. In a normal state, the host apparatus 2 only monitors the field state and does not output control commands directly to the actuator 5 in each loop 3.

In another state of the host apparatus 3, the host apparatus 2 may designate control parameters directly to the arithmetic and control portion 6 in the loop 3 or alter the control parameters set in the memory 6a and output control instructions directly to the actuator 5. The host apparatus 2 has an input means, such as a keyboard, so as to allow the operator to input various control parameters through the input means.

The control signal produced by the arithmetic and control portion 6 for operating the actuator 5, as well as the answerback signal, such as that representing the valve opening of the actuator 5 operated on the basis of the control signal, are sent from the arithmetic and control portion 6 to the host apparatus 2 through the field bus 7. The host apparatus 2 receives the answerback signal and monitors the operating state in the loop.

Figure 2:
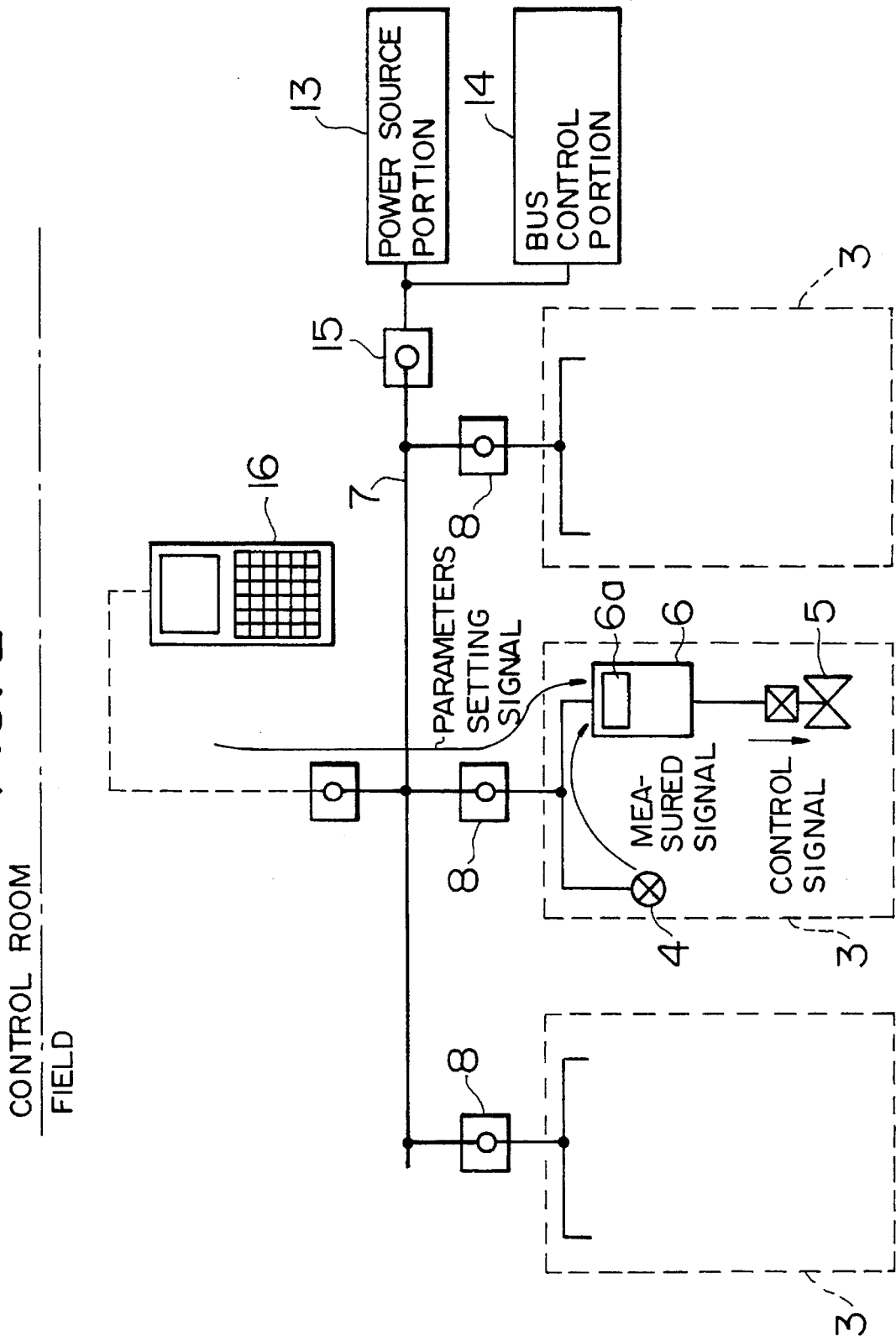
FIG. 2 illustrates how control parameters of arithmetic and control portions in each loop are set or changed.

Each of the loops 3, which are the field instruments provided on the field side, contains the arithmetic and control portion 6 which performs calculations on the measurement signal from the transmitter 4 according to the control parameters or control contents stored in the memory 6a to obtain a control signal, and executes necessary operations on the basis of the control signal. The control parameters used for the computations and the control contents in each of the loops 3 are altered according to the system conditions or objective. This alteration can be conducted from the host apparatus 2, as stated above. Alternatively, it may be conducted by communications from a specially prepared terminal 16 temporarily connected to the field bus 7 through the junction device, as clearly shown in FIG. 2. Alternatively, it may be arranged such that control parameters can be manually set by the operator using a setting portion incorporated in the arithmetic and control portion 6 in each of the loops 3.

In the above explanation, one of the plurality of loops 3 executed control operation, and sent a necessary signal to the host apparatus 2. However, since the plurality of loops 3 can operate independently, they may send the signal to the host apparatus 2 at the same time. In that case, adjustment between the loops 3 in terms of the order of transmission is needed. Data transmission timing on the bus line is controlled by the bus control portion 14. Any method, such as polling or token passing, may be used to control data transmission.

Token passing will be explained below with reference to FIGS. 3 and 4 as one example of data transmission control methods.

Figure 3:
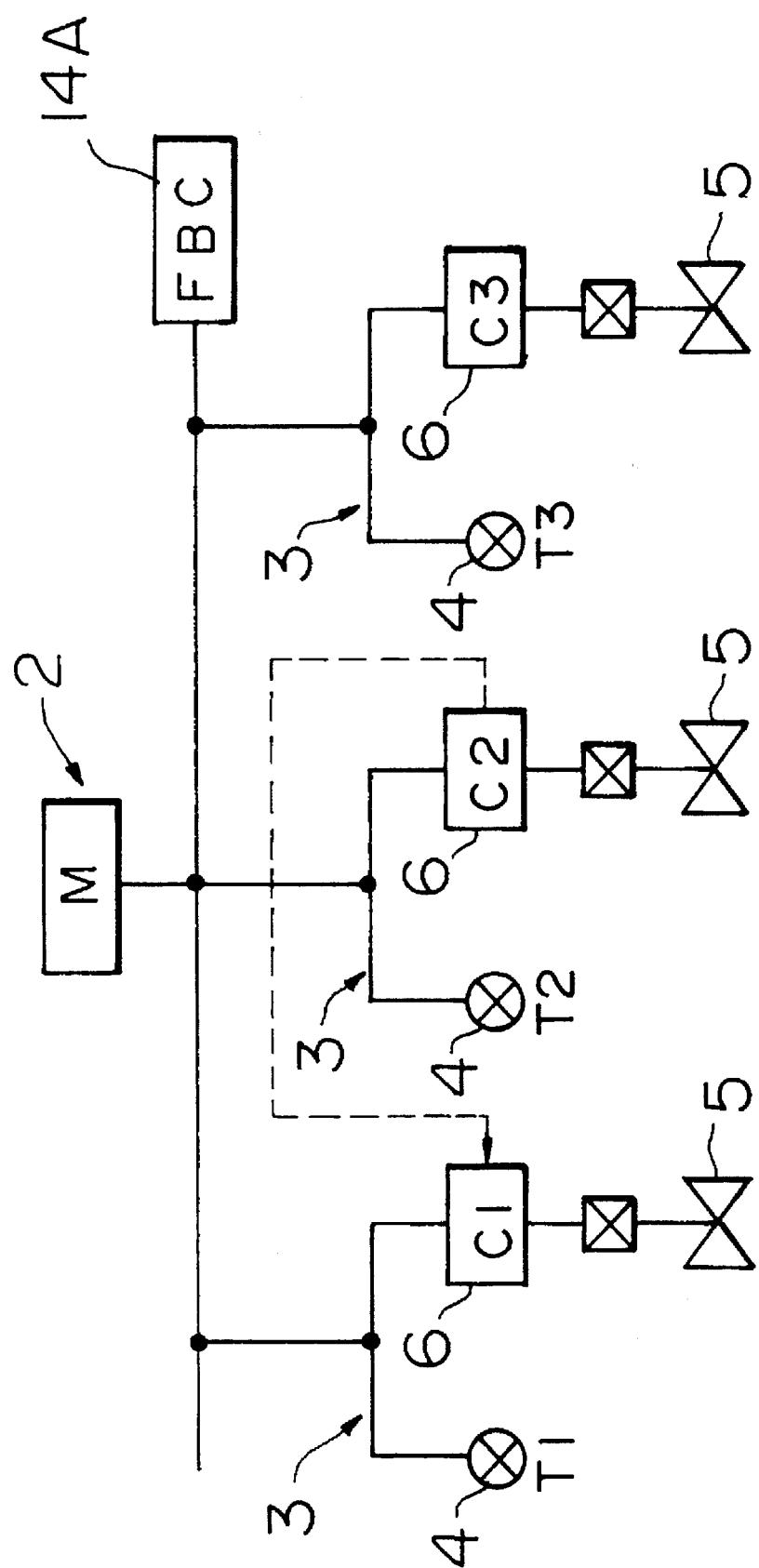
FIG. 3 illustrates a communication method.
Figure 4:
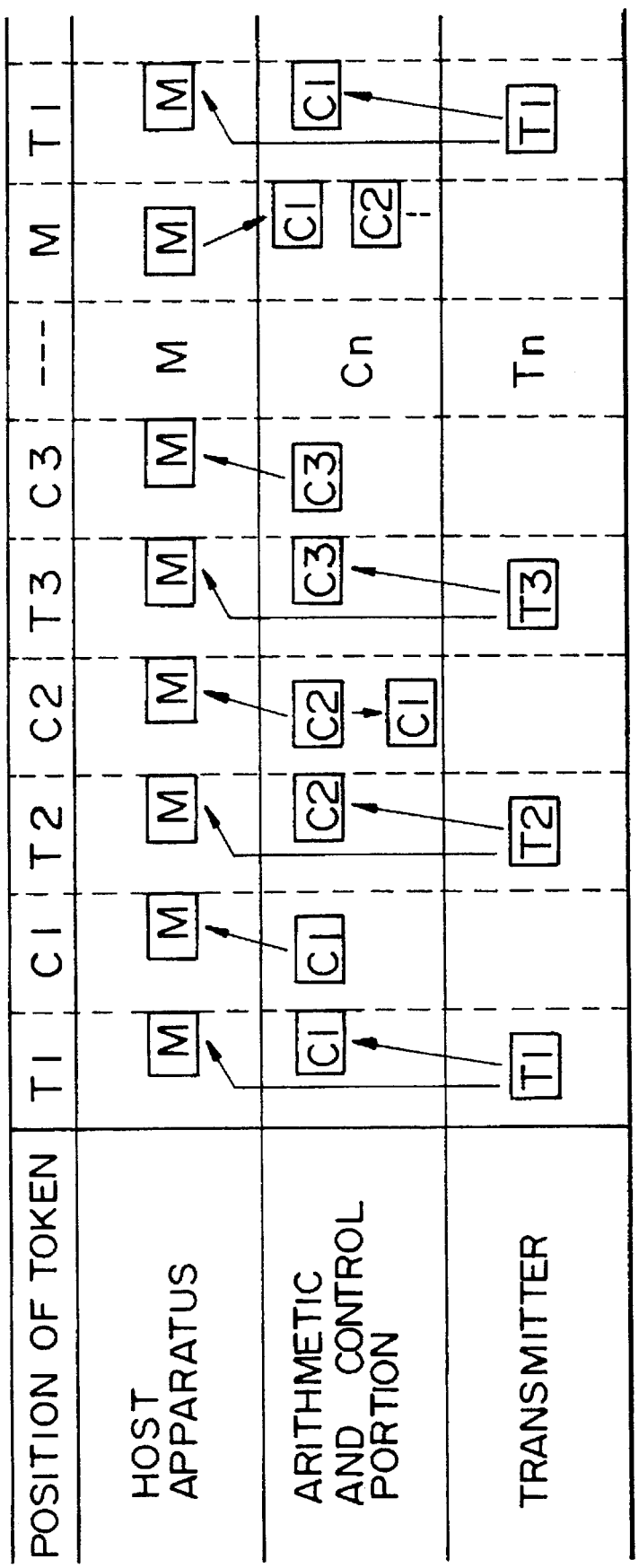
FIG. 4 shows a table indicating token circulation and destinations to which signals are respectively transmitted.

In FIG. 3, a field bus system, containing the host apparatus 2, three loops 3 and the field bus control portion (FBC) 14A, is schematically shown. In the figure, reference symbol M denotes an arithmetic and control unit of the host apparatus 2 which serves as a master controller; T1 to T3 respectively denote the transmitters of the first to third loops; and C1 to C3 respectively denote the arithmetic and control units of the first to third loops. Although not shown in the figure, it is assumed that there are T1 to Tn transmitters 4 and C1 to Cn arithmetic and control units 6.

In the field bus system shown in FIG. 3, passing controlled by the bus control portion 14A circulates in the order of T1, C1, T2, C2 . . . Tn, Cn, M, T1, . . . , as shown in the uppermost column of the table shown in FIG. 4. When token exists in the transmitter T1, the transmitter T1 transmits a measurement signal to both the arithmetic and control portion C1 in the same loop and the arithmetic and control unit M of the host apparatus 2. The arithmetic and control portion C1 performs predetermined computations by using the measurement signal and controls the actuator. The arithmetic and control unit M of the host apparatus 2 simply receives the measurement signal. Next, token shifts to the arithmetic and control portion C1, and the arithmetic and control portion C1 sends the controlled variable obtained by the aforementioned computations to the arithmetic and control unit M of the host apparatus 2, thereafter, in the same manner, token shifts in the order of T2, C2 . . . .

In this example, cascade control is performed on the arithmetic and control portion C2. More specifically, the arithmetic and control portion C2 calculates a controlled variable on the basis of the measurement signal output from the transmitter T2 and sends it to both the arithmetic and control unit M of the host apparatus 2 and the arithmetic and control portion C1. The arithmetic and control portion C1 receives the cascade setting signal from the arithmetic and control portion C2 and utilizes it as a signal for controlling the actuator connected thereto. This field bus system is arranged such that the instruments connected to the bus line can receive all the signals generated on the bus line. Hence, if the signal present on the bus line contains an address of the transmitter, the arithmetic and control portion C1 can selectively receive the necessary signals alone.

Thereafter, the every transmitter and arithmetic and control portion performs the transmission and the reception similarly in the predetermined order. When token comes to the arithmetic and control unit M of the host apparatus 2, the host apparatus 2 outputs set values or control parameters to the transmitters and the arithmetic and control portions which require them. After token circulates completely by the aforementioned series of operations, the communications are executed again in the same sequence.

The control period of communications in the above control system will be quantitatively explained below in comparison with that of the conventional control system. The control period of the above control system is given by $$Tc=n(Tt+Tn)$$

where $Tc$ is the period in which a token goes around once, $Tt$ is the communication time for a transmitter, $Tn$ is the communication time for an arithmetic and control portion, and $n$ is the number of loops connected to the field bus.

The control period for the conventional control system is calculated by $$Tc=n(Tt+Tm+Tn)$$

where $Tm$ is a processing time of the host apparatus 2.

As can be seen from the above two equations, in the control system according to the present invention, since the processing time of the host apparatus 2 is not necessary, if the communication time is made short, i.e., if the transmission speed is increased and the length of a message is made short, response speed can further be increased. Furthermore, since the control variables and the answerback signals sent from the arithmetic and control portions do not require response as often as the measurement signals do, the token used by the arithmetic and control portions can be reduced as compared with that exercised by the transmitters. In that case, the control period $Tc$ is substantially equal to $nTt$, which is a great improvement over the prior art.

In the above embodiment, each of the loops on the field side contains the arithmetic and control portion. However, the control system may be arranged such that a single arithmetic and control portion 17 is provided on the field side, as shown by the broken line in FIG. 1. In that case, the other structures and the fundamental control operation are the same as those of the aforementioned control system. Since the arithmetic and control portion 17 is provided on the field side, it can be said it is distributed and autonomous, as in the case of the aforementioned embodiment. Furthermore, this control system can maintain normal operation when a failure occurs on the control room side, and is hence durable and stable.

As stated above, since the arithmetic and control portion(s) as well as the power source and the bus control portion are provided on the field side, control operation can be executed on the field side without participation of the host apparatus. Consequently, even when a failure occurs on the control room side, stable operation can be maintained on the field side. Furthermore, when a new system is installed, operation of the field instruments installed first can be initiated by setting control parameters using a specially prepared terminal temporarily connected to the field side. Thereafter, the host apparatus is installed and operation thereof is then initiated. Therefore, monitoring and operation of the entire system can be started from when the operation of the host apparatus is initiated. Operation of the system can thus be initiated smoothly.

In a normal operation state, the host apparatus only monitors the operating state of the field instruments. In a non-steady state, the host apparatus can output control commands to the field instruments. Also, it can set or change the control parameters stored in the arithmetic and control portions on the field side. Consequently, flexibility of the system can be enhanced.

The communication buffer capable of detecting abnormality is provided on the field bus between the control room and the field so that the host apparatus can thus be separated from the field when an interference, such as external noises or crosstalk, occurs on the communication path between the control room and the field and communication becomes difficult. Consequently, reliability of the communications can be enhanced, and influence of the abnormality which occurs on the control room upon the field side can be eliminated. As a result, sound control operation can be maintained on the field side.

Since the host apparatus does not participate in the control operation which requires real time response, the load of the host apparatus can be decreased.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

I claim:

1. An autonomous distributed field bus system, comprising:

a host apparatus disposed in a control room;

a plurality of detection and control blocks disposed in a field;

a serial bus line for connecting said host apparatus to said plurality of blocks to thereby transmit control commands from said host apparatus to said plurality of blocks, and for connecting said plurality of blocks with each other to transmit control signals from one block to another block; and a communication buffer connected between said host apparatus and plurality of blocks, said communication buffer including an abnormal command detecting means, said communication buffer stopping data transmission between said host apparatus and said plurality of blocks when said host apparatus generates abnormal data, wherein each of said plurality of blocks disposed in said field has a plurality of field devices including a detection device, arithmetic and control means, an actuator and an operating device, forming a control loop, said arithmetic and control means produces a control signal by using control parameters stored therein on the basis of a measured value detected by said detection device and a control signal transmitted from said another block and operates said operating device by providing said control signal produced by said arithmetic and control means to said actuator so as to perform control operation in each of said blocks in a normal state, that is, independent of participation of said host apparatus.

2. An autonomous distributed field bus system according to claim 1, wherein a bus control portion is provided on said field.

3. An autonomous distributed field bus system according to claim 2, wherein said bus control portion gives said bus control right to said plurality of blocks in a predetermined order.

4. An autonomous distributed field bus system according to claim 3, wherein cascade communication is partly used for communication between said plurality of components.

5. An autonomous distributed field bus system according to claim 2, wherein said bus control portion gives a bus control right to said plurality of detection devices, said plurality of arithmetic and control means and said host apparatus.

6. An autonomous distributed field bus system according to claim 1, wherein said host apparatus receives output signals from said detection device and said arithmetic and control means, monitors detecting and controlling states of said field on the basis of said output signals, and controls said detection and control blocks through the control parameters when necessary.

7. An autonomous distributed field bus system according to claim 6, wherein monitoring by said host apparatus is performed only in said normal state, otherwise said host apparatus giving control commands to said blocks when necessary in a state other than said normal state.

8. An autonomous distributed field bus system according to claim 1, wherein said communication buffer includes a communication abnormality detection device so as to allow control operation to be performed by said field blocks in said normal state when said communication abnormality detection device detects communication abnormality in the control room.

9. An autonomous distributed field bus system according to claim 1, wherein said control parameters stored in said arithmetic and control means define features of control functions, and are set or changed by said host apparatus.

10. An autonomous distributed field bus system according to claim 1, wherein said control parameters stored in said arithmetic and control means define features of control functions, and are set or changed by a terminal device detachably mounted through said bus line.

11. An autonomous distributed field bus system according to claim 1, wherein said control parameters stored in said arithmetic and control means define features of control functions, and wherein said arithmetic and control means includes an adjusting portion for setting or changing said control parameters.

12. An autonomous and distributed field bus system, comprising:

a host apparatus disposed in a control room;

a plurality of detection and control blocks disposed in a field;

a serial bus line for connecting said host apparatus to said plurality of blocks, and for connecting said plurality of blocks with each other to transmit control signals from block to another block; and a communication buffer connected between said host apparatus and said blocks in said field, said communication buffer isolating the communication between said field and said control room when a communication abnormality is generated in the control room in which said host apparatus is disposed, wherein each of said plurality of blocks disposed in said field has a plurality of field devices including a detection device and an operating device, arithmetic and control means being disposed on said field and an actuator, said arithmetic and control means produces a control signal by using control parameters stored therein on the basis of a measured value detected by said detection device in any of said blocks, and operating said operating device in a corresponding block by said control signal and provides said control signal to said actuator so as to perform control operation in a normal state, that is, independent of participation of said host apparatus.

13. An autonomous distributed field bus system according to claim 12, wherein said host apparatus receives output signals from said detection device and said arithmetic and control means, and monitors detecting and controlling states of said field on said basis of the output signals.

14. An autonomous distributed field bus system according to claim 13, wherein monitoring by said host apparatus is performed only in said normal state, otherwise said host apparatus giving control commands to the blocks when necessary in a state other then said normal state.

15. An autonomous distributed field bus system according to claim 12, wherein said communication buffer includes a communication abnormality detection portion so as to allow control operation to be performed by said field blocks alone when said communication abnormality detection portion detects said communication abnormality.

16. An autonomous distributed field bus system according to claim 12, wherein said control parameters stored in said arithmetic and control means define features of control functions, and are set or changed by said host apparatus.

17. An autonomous distributed field bus system, comprising:

detection and control blocks arranged in a field side of a plant, each of said blocks including:

an actuator for controlling an object of said plant, a detection portion for detecting the object to be controlled by said actuator, and a control portion for generating a control signal to control said actuator and to make the detected value of said object to be a predetermined value;

a host apparatus for monitoring the operation of said detection and control blocks, for generating command signals to control the operation of said blocks;

a power source for supplying electric power to said detection and control blocks; and a field bus having at least one pair of electric wires connecting said blocks, said host apparatus and said power source, the electric power from said power source being supplied to said blocks through said field bus, said control signals from said blocks being transmitted to said host apparatus through said field bus, and said command signals from said host apparatus being transmitted to said control portions in said blocks.

* * * * *